United States Patent [19]

Kranz

[11] Patent Number: 4,680,387

[45] Date of Patent: Jul. 14, 1987

[54] PREPARATION OF POLYHALO-COPPER PHTHALOCYANINES HAVING A HIGH COLOR STRENGTH

[75] Inventor: Joachim Kranz, Ludwigshafen, Fed. Rep. of Germany

[73] Assignee: BASF Aktiengesellschaft, Ludwigshafen, Fed. Rep. of Germany

[21] Appl. No.: 798,391

[22] Filed: Nov. 15, 1985

[30] Foreign Application Priority Data

Nov. 17, 1984 [DE] Fed. Rep. of Germany ....... 3442118

[51] Int. Cl.$^4$ .................... C09B 47/04; C09B 47/08
[52] U.S. Cl. .................... 540/136; 540/137; 540/138
[58] Field of Search .................... 540/136, 137, 138

[56] References Cited

U.S. PATENT DOCUMENTS

| | | | |
|---|---|---|---|
| 2,276,860 | 3/1942 | Niemann et al. | 260/314 |
| 2,833,784 | 5/1958 | Ehrich | 260/314.5 |
| 2,862,929 | 12/1958 | Caliezi et al. | 260/314.5 |
| 2,873,279 | 2/1959 | Randall et al. | 260/314.5 |
| 3,424,759 | 1/1969 | Stewart et al. | 260/314.5 |
| 4,067,881 | 1/1978 | Geeren et al. | 260/314.5 |
| 4,077,974 | 3/1978 | Wessling | 260/314.5 |
| 4,091,028 | 5/1978 | Barraclough et al. | 260/314.5 |
| 4,297,281 | 10/1981 | Wessling | 260/314.5 |
| 4,330,470 | 5/1982 | Segawa et al. | 260/245.84 |
| 4,452,740 | 6/1984 | Pepoy | 260/245.83 |

FOREIGN PATENT DOCUMENTS

| | | |
|---|---|---|
| 2052937 | 5/1972 | Fed. Rep. of Germany . |
| 2707849 | 1/1977 | Fed. Rep. of Germany . |
| 1502565 | 3/1978 | United Kingdom . |

OTHER PUBLICATIONS

The Phthalocyanines, vol. II, Manufacture and Applications, (CRC Press, Inc., Boca Raton, Florida, 1983), pp. 41–52.

Phthalocyanine Compounds, (Reinhold Publishing Corporation, New York, 1963), pp. 170–191.

Primary Examiner—Richard L. Raymond
Attorney, Agent, or Firm—Oblon, Fisher, Spivak, McClelland & Maier

[57] ABSTRACT

Finely divided, agglomerated crude polyhalo-copper phthalocyanine is recrystallized (conditioned) by heating the crude pigment with benzoic acid, toluic acid, ethylbenzoic acid or a mixture of these, in the presence of water, at from 80° to 130° C.

The resulting polyhalo-copper phthalocyanine pigments are readily dispersible and of high color strength, and pigmentary forms ranging from transparent to high-hiding can be obtained in a selective manner.

The carboxylic acids used as conditioning media can readily be recovered by acidifying the mother liquor.

4 Claims, No Drawings

PREPARATION OF POLYHALO-COPPER PHTHALOCYANINES HAVING A HIGH COLOR STRENGTH

Halogenation of copper phthalocyanine gives an amorphous or microcrystalline, agglomerated, crude polyhalo-copper phthalocyanine which is highly agglomerated and therefore gives dull colorations possessing little depth. For this reason, the crude pigment is recrystallized to convert it to pigmentary forms possessing optimum tinctorial properties. This process, also referred to as either conditioning or finishing, is carried out, for example, with heating, in 90–98% strength by weight sulfuric acid, in xylene (German Pat. No. 2,013,818) or in o-nitrophenol (German Pat. No. 1,242,180).

Pigmentary forms possessing interesting tinctorial properties are obtained by means of a heat treatment in o-nitrophenol. However, this conditioning medium has substantial disadvantages: it has a strong smell since it possesses a marked vapor pressure at as low as room temperature, and it sublimes readily and is volatile in the presence of steam. Further disadvantages are that o-nitrophenol has a low melting point and a marked solubility in water, resulting in losses during recovery.

An additional disadvantage is the fact that the o-nitrophenolate anion formed during removal of the nitrophenol by the addition of an alkali metal hydroxide has a high affinity for the polyhalo-copper phthalocyanine pigment, necessitating a long washing process to permit substantially quantitative removal of the nitrophenolate.

It is an object of the present invention to provide a process for conditioning crude, finely divided, agglomerated polyhalo-copper phthalocyanine, which gives piments similar to those obtained by the nitrophenol process but does not have the disadvantages of the said process.

We have found that this object is achieved, and that pigmentary forms of polyhalo-copper phthalocyanines having useful tinctorial properties are obtained by treating finely divided, agglomerated polyhalo-copper phthalocyanines in an organic aqueous phase at elevated temperatures, if the finely divided, agglomerated crude pigment is heated to 80°–130° C. with benzoic acid, toluic acid, ethylbenzoic acid or a mixture of these, and kept at this temperature.

The process gives readily dispersible polyhalo-copper phthalocyanine pigments possessing high color strength. Compared to the prior art polyhalo-copper phthalocyanine pigments obtained by conditioning in o-nitrophenol, pigments obtained by the novel process give colorations having the same or superior tinctorial properties.

It was surprising that a substantially smaller amount of finishing medium was required in the novel process than in the process of German Pat. No. 1,242,180. It was also surprising that the particle size of the pigments can be influenced by varying the amount of conditioning medium used according to the invention, so that, in the novel process, the particle size can be selectively adjusted to give pigments ranging from finely divided and transparent to coarsely crystalline and high-hiding.

The novel process has the further advantage that the finishing medium used can be recovered readily and without substantial losses after the pigment has been isolated.

The process according to the invention is carried out in general in such a way that the crude polyhalo-copper phthalocyanine obtained in the synthesis, preferably in the form of the aqueous press cake, is mixed with the carboxylic acids. This mixture is heated to 80°–130° C., preferably to 90° C. to the boiling point of the mixture, and kept at this temperature until the desired pigmentary form has formed. It is critical with regard to the process that the carboxylic acid or acids are present in liquid form in the suspension during conditioning; if necessary, the procedure must be carried out at above 100° C., for example under superatmospheric pressure.

When the desired pigmentary form has been obtained, the mixture is cooled to 70°–90° C., the carboxylic acids are dissolved by adding an alkali metal hydroxide, e.g. 10% strength by weight potassium hydroxide solution or, preferably, sodium hydroxide solution, and the pigment is isolated by filtration of centrifuging and is washed neutral with water.

The carboxylic acids can be precipitated from the alkaline filtrate by acidification and recovered in this manner. Because of the low solubility, losses of the finishing medium during recovery are only about 2–3% by weight. The moist filter residue obtained can be used directly for a further conditioning procedure.

Suitable conditioning media are benzoic acid, toluic acids, ethylbenzoic acids and mixtures of these. It is critical with regard to the conditioning procedure that the acids be in liquid form at the temperatures employed. Accordingly, o- and m-toluic acid and o- and m-ethylbenzoic acid are preferred among the pure carboxylic acids, since these carboxylic acids permit conditioning to be carried out in the presence of water under atmospheric pressure. Benzoic acid, p-toluic acid and p-ethylbenzoic acid have melting points of above 120° C., and these acids can therefore be used alone for conditioning only at above the melting point, i.e. under superatmospheric pressure.

Since mixtures of benzoic acid with o- and m-toluic acid or with o- and m-ethylbenzoic acid have melting points of about 100° C. or lower mixtures of one or more of the stated alkyl benzoic acids with benzoic acid can also be used to effect conditioning under atmospheric pressure at from 80° C. to the boiling point. The boiling point of the water can be increased not only by employing superatmospheric pressure but also by adding a salt, e.g. sodium chloride or sodium sulfate.

For example, the melting point of technical-grade benzoic acid can be reduced from about 120° C. to about 75° C. by admixing o- or m-toluic acid in an aqueous medium. A mixture of 90% by weight of benzoic acid and 10% by weight of o- or m-toluic acid has a melting point of about 95° C., an 8:2 mixture has a melting point of about 85° C. and a 7:3 mixture has a melting point of about 75° C.

For reasons relating to tinctorial properties and process engineering, o- and m-toluic acid, o- and m-ethylbenzoic acid, mixtures of these acids and mixtures of one or more of these carboxylic acids with benzoic acid are particularly preferred.

For economic reasons, conditioning is carried out in particular in o- or m-toluic acid, in a mixture of these acids or in a mixture of one or more of these acids with benzoic acid. The amount of conditioning medium is not critical, provided that it is suffient to ensure that the crude pigment is coated with the liquid acids. As a rule, the amount of acids is from 0.3 to 5 times, preferably from 0.5 times to twice, the weight of crude pigment.

Suitable polyhalophthalocyanines are polyhalocopper phthalocyanines containing from 10 to 16 chlorine atoms and polybromochlorocopper phthalocyanines containing from 0 to 13, preferably from 4 to 12, chlorine atoms and from 14 to 2, preferably from 12 to 4, bromine atoms in the molecule.

The Examples which follow illustrate the process. Parts and percentages are by weight. The temperature is stated in degrees Celsius.

CuPc = copper phthalocyanine.

EXAMPLE 1

In a stirred vessel, 51 parts of crude polychloro-CuPc (chlorine content 49.5%), in the form of a 34% strength aqueous press cake, were mixed with 35 parts of m-toluic acid, and the stirred mixture was heated. A flush was formed at from 80° to 90° C., i.e. the crude pigment passed over into the melting or molten toluic acid. The mixture was stirred for 8 hours at 100° C., the crude pigment being converted into the pigmentary form consisting of compact, isometric particles.

When the mixture had been cooled to 90° C., an amount of 10% strength sodium hydroxide solution based on the amount of toluic acid used was added, and the pigment was filtered off, washed neutral and dried. 50 parts of a green pigment which had high color strength, gave pure hues and highly transparent colorations and was in the form of a very soft powder were obtained. The depth, hue, brilliance and purity of shade, and transparency of the colorations obtained with the pigment were virtually identical to those of the colorations obtained with a polychloro-CuPc pigment prepared by the process of German Pat. No. 1,242,180.

About 97% of the m-toluic acid used for conditioning were recovered from the alkaline mother liquor and from the first filtrate obtained during washing, by cooling and then acidifying with hydrochloric acid or sulfuric acid.

EXAMPLE 2

The procedure described in Example 1 was followed, except that, instead of m-toluic acid, the same amount of o-toulic acid was used. A green pigment having very similar tinctorial properties and performance characteristics was obtained. About 95% of the o-toluic acid employed was recovered from the alkaline mother liquor and wash liquor by acidification.

EXAMPLE 3

The procedure described in Example 1 was followed, except that, instead of m-toluic acid, a 1:1 mixture of m- and o-toluic acid was used. A green pigment having virtually the same tinctorial properties and performance characteristics resulted. The finishing medium was recovered as described in Example 1 (96% of the toluic acid mixture used).

EXAMPLE 4

The procedure described in Example 1 was followed, except that, instead of the press cake of highly chlorinated copper phthalocyanine, an aqueous press cake consisting of polybromochloro-CuPc (chlorine content 7%, bromine content 58%) was used. Conditioning was carried out by stirring for 6 hours at 100° C. Working up the mixture gave a pigment which produced very deep, pure, yellowish green colorations and was in the form of a soft powder. About 97% of the conditioning medium was recovered.

EXAMPLE 5

The procedure described in Example 4 was followed, except that, instead of m-toluic acid, the same amount of o-toluic acid was used. A green pigment having virtually the same tinctorial properties as the pigment according to Example 4 was obtained. About 95% of the conditioning medium was recovered.

EXAMPLE 6

The procedure described in Example 4 was followed, except that, instead of m-toluic acid, a 1:1 mixture of o-and m-toluic acid was used. The resulting green pigment resembled the pigments obtained as described in Examples 4 and 5 in all tinctorial properties. 95% of the toluic acid mixture was recovered for further use.

EXAMPLE 7

The procedure described in Example 1 was followed, except that, instead of polychloro-CuPc, the crude polybromochloro-CuPc (chlorine content 26%, bromine content 33%), in the form of the aqueous press cake, was used. The mixture was stirred for 4 hours at 100° C. and then worked up to isolate a green pigment which was in the form of a soft powder and gave yellowish green colorations of very pure hues. 97% of the conditioning medium was recovered.

EXAMPLE 8

In a stirred vessel, 50 parts of crude polybromochloro-CuPc (chlorine content 7%, bromine content 58%), in the form of a 24% strength aqueous pigment press cake, were heated at the boil with 50 parts of benzoic acid and 30 g. of sodium chloride. The mixture was stirred for 5 hours at from 103° to 106° C., after which recrystallization was completed. Working up as described in Example 1 gave a pigment having performance characteristics similar to those of the pigment obtainable as described in Example 4. About 95% of the benzoic acid used was recovered.

The same result in terms of tinctorial properties was obtained when sodium chloride was replaced with sodium sulfate.

EXAMPLE 9

The procedure described in Example 3 was followed, except that, instead of the 1:1 mixture of the two toluic acids, a mixture of benzoic acid and o-toluic acid in a weight ratio of 9:1 was used. The green pigment isolated had tinctorial properties and performance characteristics similar to the pigment obtained as described in Example 3.

The same advantageous result was obtained when an 8:2 or 7:3 mixture of benzoic acid and o-toluic acid was used as the conditioning medium.

The same result was also obtained when, in the above mixtures, the o-toluic acid was replaced with m-toluic acid or a mixture of o-toluic acid and m-toluic acid.

Equally successful results were obtained when the o-toluic acid and m-toluic acid were replaced with o-ethylbenzoic acid and m-ethylbenzoic acid.

EXAMPLE 10

The procedure described in Example 6 was followed, except that the finishing medium used was a mixture of benzoic acid and o- and/or m-toluic acid.

|     | Benzoic acid [parts] | o-Toluic acid | m-Toluic acid |
| --- | --- | --- | --- |
| (a) | 9 | 1 | — |
| (b) | 9 | — | 1 |
| (c) | 8 | 2 | — |
| (d) | 8 | — | 2 |
| (e) | 7 | — | 3 |
| (f) | 7 | 3 | — |
| (g) | 7 | 2 | 1 |
| (h) | 8 | 1 | 1 |

The resulting pigments had tinctorial properties and performance characteristics similar to those of the pigment obtained as described in Example 6.

More than 95% of the conditioning medium was recovered from the mother liquor in every case.

Results similar to those under (a) to (h) were obtained when o- and/or m-toluic acid were replaced with the corresponding ethylbenzoic acids.

EXAMPLE 11

The procedure described in Example 4 was followed. 51 parts of crude polybromochloro-CuPc (7% of Cl, 58% of Br), in the form of a 34% strength aqueous press cake, were refluxed with 35 parts of a mixture of 80% of benzoic acid and 20% of toluic acid for 6 hours. The pigment was isolated as described in Example 4. 95% of the conditioning medium was recovered from the alkaline mother liquor and from the first wash water.

EXAMPLE 12

The procedure described in Example 11 was followed, except that 70 parts of the acid mixture were used.

The pigments obtained as described in Examples 11 and 12 were compared with the pigment obtainable from the same crude pigment by the method described in German Pat. No. 1,242,180, Example 3, as a white reduction (1/9th standard depth).

| Pigment | CE[1] | HGD | C | Transparency against comparison | |
| --- | --- | --- | --- | --- | --- |
| Example 11 | 98 | Δ+0.1[2] | Δ+1.6[4] | +4 more transparent | than the comparison |
| Example 12 | 96 | Δ−0.2[3] | Δ+1.6[4] | −2 somewhat more high-hiding | |
| Prior art | 100 | 165.64 | 47.75 | Comparison | |

[1]Color strength equivalent

[2]bluer = +
[3]yellower = −
[4]substantially purer in hue
} than the comparison

EXAMPLE 13

The procedure described in Example 11 was followed, except that 100 parts of m-toulic acid were used, and the mixture was refluxed for 3 hours. More than 95% of the conditioning medium was recovered.

EXAMPLE 14

The procedure described in Example 13 was followed, except that the mixture was kept at 130° C. for 3 hours (under superatmospheric pressure).

The pigments obtained as described in Examples 13 and 14 were compared with the prior art pigments obtainable from the same crude pollybromochloro-CuPc described in German Pat. No. 1,242,180 Example 3, as a white reduction.

| Pigment | CE[1] | HGD | C | Transparency | |
| --- | --- | --- | --- | --- | --- |
| Example 13 | 97 | Δ+0.2[2] | Δ+1.2[4] | +5 substantially more transparent | than the comparison |
| Example 14 | 96 | Δ−0.3[3] | Δ+1.2[4] | −4 more high-hiding | |
| Prior art | 100 | 165.64 | 47.75 | Comparison | |

[1]Color strength equivalent

[2]bluer
[3]yellower
[4]substantially purer in hue
} than the comparison

I claim:

1. In a process for preparing a polyhalocopper phthalocyanine having high color strength by recrystalliation of a finely divided, agglomerated crude polyhalcopper phthalocyanine in an organic aqueous phase at elevated temperatures, the improvement comprising heating said crude polyhalocopper phthalocyanine to 80°-130° C. with benzoic acid, toluic acid, ethylbenzoic acid, or a mixture thereof, and maintaining said elevated temperature until the desired pigmentary form has formed.

2. A process as claimed in claim 1, wherein the weight ratio of crude pigment to the carboxylic acids is from 1:0.5 to 1:2.

3. A process as claimed in claim 1, wherein benzoic acid, o-toluic acid, m-toluic acid, 2-, 3- or 4-ethylbenzoic acid or a mixture of these carboxylic acids is used.

4. A process as claimed in claim 1, wherein the mixture is heated at from 90° C. to boiling point.

* * * * *